United States Patent [19]
Watson

[11] 3,952,519
[45] Apr. 27, 1976

[54] HEAT TRANSFER SYSTEM EMPLOYING SUPERCOOLED FLUIDS

[75] Inventor: William K. R. Watson, San Diego, Calif.

[73] Assignee: Kay Laboratories, Inc., San Diego, Calif.

[22] Filed: July 2, 1973

[21] Appl. No.: 375,512

[52] U.S. Cl. .................................. 60/641; 60/659; 252/70
[51] Int. Cl.[2] .................................... F03G 7/02
[58] Field of Search ............. 60/37, 36, 38, 26, 641, 60/649, 652, 659; 252/70

[56] References Cited
UNITED STATES PATENTS

| | | | |
|---|---|---|---|
| 784,005 | 2/1905 | Ketchum | 60/26 |
| 2,118,586 | 5/1938 | Bowles et al. | 252/70 |
| 2,808,494 | 10/1957 | Telkes | 252/70 UX R |
| 2,827,438 | 3/1958 | Broadley et al. | 252/70 |
| 2,933,885 | 4/1960 | Benedek et al. | 60/26 |
| 2,968,916 | 1/1961 | Taylor et al. | 60/26 |
| 2,969,637 | 1/1961 | Rowekamp | 60/641 |
| 3,621,653 | 11/1971 | Pacault et al. | 60/38 |
| 3,625,817 | 12/1971 | Anderson | 60/38 X R |

*Primary Examiner*—Martin P. Schwadron
*Assistant Examiner*—H. Burks, Sr.
*Attorney, Agent, or Firm*—Ellsworth R. Roston

[57] ABSTRACT

In a system for converting heat energy to mechanical energy, a working fluid is vaporized and then permitted to expand in an expander. The vaporized working fluid is introduced to a condenser including a container and a conduit for guiding the working fluid through the container. A condensing medium in a generally solid state is disposed in the container in contact with the conduit to absorb heat from and thereby condense the working fluid. In response to the absorbed heat, the condensing medium liquifies, in which state it can be supercooled at ambient temperatures and stored for an extended period of time. The supercooled condensing medium can be triggered at a predetermined time to release the absorbed heat to the system. The provision of a super-coolable condensing medium in the condenser minimizes the heat loss thus providing a significant increase in the overall efficiency of the system.

20 Claims, 3 Drawing Figures

HEAT TRANSFER SYSTEM EMPLOYING SUPERCOOLED FLUIDS

BACKGROUND OF THE INVENTION

1. Field of the Invention

This invention relates generally to apparatus for condensing a vaporized fluid and more specifically to the use of such an apparatus in a solar energy converter.

2. Description of the Prior Art

Most apparatus providing a source of mechanical or electrical power rely upon some source of heat energy. This heat energy typically results from the combustion of fuels such as oil, gas, coal and gasoline. In some systems, nuclear materials have undergone fission to provide the heat energy.

The heat provided by these sources of energy has been converted into either electricity or mechanical work, unfortunately with tremendous inefficiency. The inefficiency has occurred as a result of the loss from the system of a very large portion of the heat provided by the source of energy. This lost heat has not been available for conversion into either electrical or mechanical work. By way of example it will be noted that internal combustion engines typically have an efficiency of 22%, diesel engines have an efficiency of approximately 40%, and nuclear or conventional power stations have an efficiency of approximately 50%.

Electrical power stations are typical of those sources of power which rely upon a source of heat energy. In these power stations, the heat is used to vaporize a working fluid, such as water, to provide steam having a high temperature and pressure. The steam is introduced to an expander, such as a stream engine or turbine, wherein the steam expands initially at substantially constant temperature, and subsequently at substantially constant entropy. This expansion provides mechanical work and additionally reduces the temperature and pressure of the steam.

In order to pump the working fluid back to the heat source, the exhaust steam is introduced into a condenser where it is cooled to a liquid state. This condensation is typically accomplished with vast condensing towers or the use of a relatively cold condensing medium. The condensing medium has typically included water which has been provided by a source such as a lake, river or ocean. After passing through the condenser, the heated condensing medium has been returned to the cooling source. It can be appreciated that this heat absorbed by the condensing medium has been lost as far as its conversion to power is concerned. Particularly disturbing has been the fact that as much energy has been lost in heating the condensing medium as has been provided by the engine or turbine in the form of electrical or mechanical power.

Some energy converters have relied upon solar radiation to heat the working fluid. Solar radiation is a preferred source of energy for several reasons. First, the quantity of energy available is generally unlimited. Additionally, the solar energy is relatively powerful, providing approximately one horsepower per square yard of surface when the rays of the sun are received normal to the surface. Furthermore, solar radiation is "free" when it is available.

The questionable availability of solar radiation is perhaps the primary deficiency of such a solar energy converter. The sun cannot be relied upon to shine continuously upon any particular area of the earth. Of course during the nighttime no radiant energy is received from the sun, but even during the daytime a considerable portion of the solar radiation may be intercepted by clouds and haze. These factors have reduced the reliability of solar radiation as a source of heat.

To provide for these "rainy days" it has been desirable to store energy in some form. It is known that energy in an electrical form can be stored in batteries. However, the cost of batteries having a capacity sufficient to store a large amount of electrical energy has been prohibitive. Furthermore, batteries have had an internal resistance which gradually dissipates the stored energy. As a consequence, batteries have not been capable of storing electrical energy for significant periods of time.

It is known that the dissipation of heat energy from an object can be reduced if the object is thermally insulated. For example, hot fluids have been disposed in vacuum bottles to inhibit the transfer of heat from the enclosed fluid through the walls of the bottle. These vacuum bottles as well known to be ineffectual for extended periods of time. This would make such insulating means inapplicable to the present invention for the long term storage of thermal energy. Other insulating means such as that used to lag pipes would be similarly undesirable for storing heat energy over an extended period of time.

SUMMARY OF THE INVENTION

In accordance with the present invention, a storage means such as a condenser is provided which has characteristics for storing energy in the form of heat. When used in a power system, this storage means or condenser significantly reduces the amount of energy lost to the environment. Instead, the stored energy is retained in the system, so that substantially 100% of the heat energy provided by the heat source is ultimately converted into power. As a practical matter, for a given power output, a heat source may use approximately one half the quantity of fuel used by prior systems In a solar energy converter, only about one-half the solar radiation of the present system is needed for a given power output.

Of significant advantage is the fact that the heat energy in the present condenser or storage means can be stored for a substantially indefinite period of time. This stored energy can be subsequently released to provide a source of heat when the radiant energy of the sun is no longer available. Heat continues to be available even when the rays of the sun are blocked so that the primary deficiency of solar energy converters of the prior art is overcome by the present invention.

In the storage means or condenser of the present invention, the condensing medium includes a first chemical having a particular melting temperature and characteristics for maintaining a relatively fluid stage at temperatures below the particular melting temperature. Under these conditions, the chemical is said to be supercooled. This first chemical can be disposed in the converter in a generally solid state so that when heat is absorbed from the working fluid to condense or otherwise transfer heat from the working fluid, the chemical is heated above its particular melting temperature. This provides the first chemical with a generally fluid state. The fluid chemical is then allowed to drain from the converter into a tank where it can be stored for a substantially indefinite period of time. In the tank, the chemical supercools to maintain the generally fluid state even at temperatures below the particular melting temperature.

At a time when the radiant energy of the sun cannot be received to provide a source of heat, a particular choice of working fluid can be heated by the first supercooled chemical. For example the working fluid and the first supercooled chemical can be separated in a heat exchanger such as a boiler. Then a triggering means, such as a second chemical, can be introduced to the first chemical to trigger the crystallization of the first chemical. This crystallization will occur at the particular melting temperature of the first chemical which will be greater than the boiling point of the working fluid which in turn is higher than the ambient temperature. In this manner the heat energy stored in the first chemical can be released to the working fluid in the boiler to heat and thereby vaporize the working fluid and drive the expander.

In a particular embodiment, a second working fluid such as Freon "11" may be used in the heat exchanger and a second expander responsive to the Freon vapor can provide the power output of the system. A particularly desirable first chemical is that provided by sodium acetate which has characteristics for crystallizing to release 42 calories per gram at a particular melting temperature of 58° C. This first chemical is particularly desirable for use with the Freon "11" which has a boiling point of approximately 24° C.

These and other features and advantages of the present invention will be more apparent with a description of preferred embodiments discussed with reference to the associated drawings.

DESCRIPTION OF THE PREFERRED EMBODIMENTS

Figure 1:
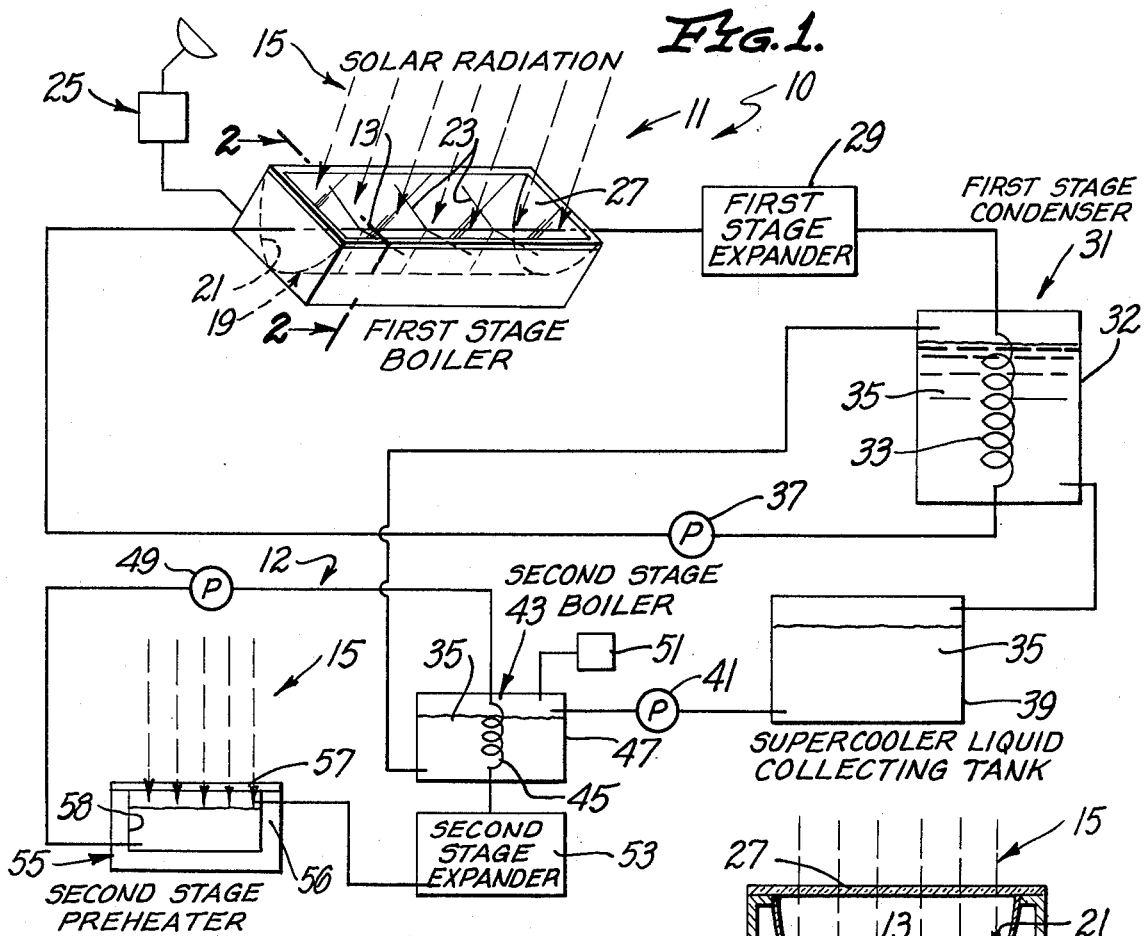
FIG. 1 is a schematic diagram of a solar energy converter including one embodiment of the condenser of the present invention.

An energy converter is illustrated in FIG. 1 to include a first stage 10 and a second stage 12. In the first stage 10, a heat source 11 or boiler provides heat for vaporizing a first working fluid or for heating a liquid which is typically guided by a conductor 13 through the heat source 11. The heat source 11 can be any of those noted in the prior art to derive heat from the combustion of oil, gasoline, coal or gas. The heat source 11 may also be of the type providing heat from the breaking up into fission fragments of nuclear materials such as uranium. In the particular embodiment illustrated, however, the heat source 11 derives heat from the radiant energy of the sun which is characterized by the rays 15.

Figure 2:
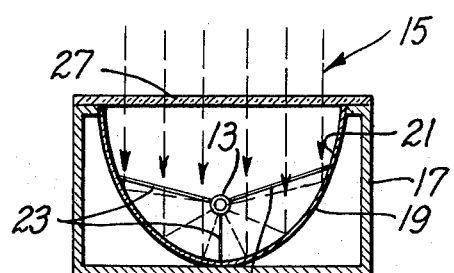
FIG. 2 is an end elevation view of a reflector for conveying solar radiation to provide a source of heat.

As illustrated in FIGS. 1 and 2, this solar heat source 11 will typically include a frame 17 providing structural support for a reflector 19. The reflector 19 has a reflecting surface 21 with characteristics for receiving the essentially parallel rays 15 of the sun and reflecting the rays 15 so that in a particular cross section of the reflector 19, the rays 15 converge at a point, typically referred to as the point of focus. The conductor 13 is preferably disposed to pass through this point of focus to receive the concentrated solar heat energy.

The reflector 19 may be longitudinal in configuration and the reflecting surface 21 may define a parabola in axial cross section as shown in FIG. 2. In such an embodiment each axial cross section will provide a point of focus and collectively the points of focus will define a line of focus along which the conductor 13 is preferably disposed. As the rays 15 of the sun strike the reflecting surface 21 of the reflector 19, they will be reflected to converge on the conductor 13; the first working fluid in the conductor 13 will be heated by this concentrated solar energy.

The conductor 13 can be held in its preferred position along the line of focus by plurality of wires 23 which can be attached at one of their ends to the pipe 13 and at the other of their ends to the reflector 19. The conductor 13 may be coated, at least in proximity to the reflector 19, with a material such as black paint having a high emissivity. This coating will enhance the absorption of heat by the conductor 13. In a preferred embodiment the reflector 19 is formed from an aluminum sheet and the surface 21 is polished to enhance the reflection of the rays 15.

To inhibit the loss of heat from the conductor 13 by convection, it may be desirable to inhibit the flow of air around the conductor 13. In a preferred embodiment, the frame 17 defines an enclosure with a sheet 27 which faces the surface 21. The sheet 27 may be either rigid or flexible, but it is preferably transparent to permit the rays 15 to pass through the sheet 27 to the reflecting surface 21. In a preferred embodiment, the sheet 27 is formed from a transparent plastic material.

In an embodiment of the present invention which includes a solar heat source 11, it is desirable that the reflector 19 be positioned so that the pipe 13 is substantially perpendicular to the rays 15 of the sun. Since the sun rotates with respect to the surface of the earth, a tracking means, shown generally at 25 in FIG. 1, can be provided to track the sun and rotate the reflector 19 accordingly.

In a preferred embodiment of a solar heat source 11, the reflector 19 can be of a size sufficient to receive the rays 15 of the sun which would otherwise fall on approximately two square yards of the surface of the earth. When the rays 15 pass normal to the atmosphere and perpendicular to the conductor 13 at the line of focus, a reflector 19 of this size will develop approximately two horsepower of heat energy.

In this particular embodiment, the first working fluid may comprise water having a vaporizing temperature of 100° C. The water in the conductor 13 will enter the heat source 11 at a temperature of approximately 58° C. It will exit the heat source 11 at a temperature of approximately 158° C. and a pressure such as 85 lbs. per square inch. At this high pressure and temperature, the water at the output of the heat source 11 will have a vapor state as it passes to an expander 29. It will be appreciated that the temperature of the water can be heated to a temperature less than that producing vaporization of the water.

The expander 29 will typically be a steam engine or turbine providing a source of mechanical power. In the expander 29, the steam will initially expand at a substantially constant temperature and pressure. A further adiabatic expansion of the steam in the expander 29 will decrease the temperature of the steam to substantially that of the expander 29. The pressure of the steam will also decrease to substantially atmospheric pressure. Even under these conditions the water will typically maintain the vapor state.

As is well known in the state of the art, in order to reduce the volume and facilitate the pumping of the first working fluid, it is desirable that the steam from the expander 29 can be condensed to transfer heat or that the heat from the heated water can be cooled to transfer heat. Therefore, in the present invention, the steam from the expander 29 is conducted through a condenser 31. The condenser 31 can be substantially any heat exchanger providing for the separation of first and second materials between which the heat is to be exchanged. Thus, is a preferred embodiment, the condenser is provided with a coil 33 which conducts the first working fluid, such as steam, through a container 32. A condensing medium 35 is disposed within the container 32 in substantial contact with the outer surface of the coil 33. The condensing medium 35 absorbs heat from the steam so that the water of the first working fluid is condensed. In this liquid state, the water can be induced by a pump 37 to flow back to the heat source 11 to complete the energy cycle. It will be appreciated that other heat transfer means than the condenser 31 can be used to transfer heat, particularly when the medium transferring heat constitutes a heated liquid rather than a vapor.

Of course, chemicals other than water may be used for the first working fluid and some of these chemicals may have a boiling point lower than the ambient temperature. Under these circumstances it may be desirable to pressurize the condenser 31 to raise the boiling point of the first working fluid.

The condensing medium 35 is preferably introduced to the condenser 31 in a generally solid state characterized by substantial solid portions, but sufficient fluid portions to facilitate pumping of the condensing medium 35. In this generally solid state, the condensing medium 35 will have a temperature below its particular melting temperature.

As previously discussed, the condensing media of the past have typically included cool water which has been pumped from a lake, river, or ocean to condense the first working fluid. After the heat from the working fluid has been absorbed, the condensing medium and the absorbed heat have been returned to the water source. Since approximately as much heat has been returned to the water source as has been converted to mechanical energy by the expander, these systems of the prior art had overall thermodynamic efficiencies of less than 50%.

The condensing medium 35 of the present invention also absorbs heat from the first working fluid; however this condensing medium 35 is retained so that the absorbed heat can be subsequently used in the system. As a result, the overall efficiency of the present energy converter approaches 100% when both mechanical output and heat retention are considered.

Supercoolable chemicals are particularly desirable for use as the condensing medium 35 since they each have a particular melting temperature and characteristics for maintaining a liquid state for extended periods of time even at temperatures below the particular melting temperature. When such a chemical it is in the liquid state below its melting temperature, it is said to be supercooled. In the supercooled state, the chemical can be triggered at any time to crystallize at the higher temperature of its melting point. During this crystallization, the heat absorbed by the chemical to achieve the supercooled state is released at the substantially constant temperature of its melting point. Since this melting point is higher than the temperature at which the supercooled chemical is stored, the chemical becomes a source of heat when triggered. These characteristics of supercoolable chemicals are explained in greater detail in copending application Serial Number 357,817 which was filed in the Patent Office on May 7, 1973, and which is assigned of record to the assignee of record of the present application.

Figure 3:
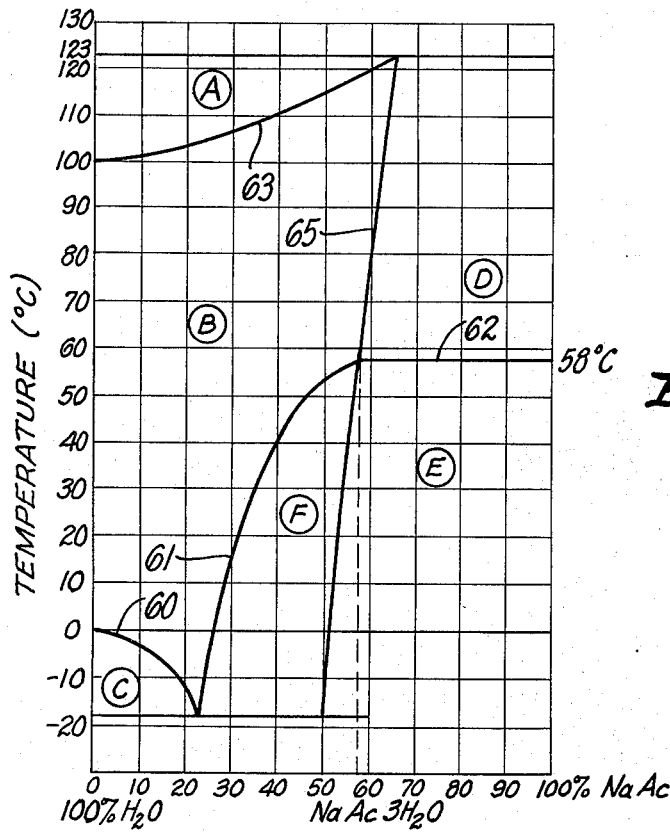
FIG. 3 is a graph illustrating the temperature and phase characteristics of a condensing medium adapted for use in the condenser of the present invention.

A supercoolable chemical which is particularly desirable for use with a first working fluid of water is sodium acetate trihydrate which has a melting temperature of approximately 58° C. The sodium acetate trihydrate is advantageous to the present invention not only due to its desirable melting temperature but also because of its desirable phase characteristics. In FIG. 3, a graph is provided which shows the melting temperatures and phase of a compound including sodium acetate and water. On this graph, the lines 60 and 61 show the melting point of the compound for various percentages by weight of the anhydrous sodium acetate in the water. It will be noted that with zero percent sodium acetate, corresponding to 100% water, the compound has a melting point of 0° C., the melting point of water. As the percentage of sodium acetate in the compound is increased to approximately 23%, the melting point of the compound drops along a line 60 to a temperature of approximately $-18°$ C. As the percentage of sodium acetate is further increased to approximately 60%, the melting point of the compound rises along a line 61 to approximately 58° C., the melting temperature of sodium acetate trihydrate. This melting temperature of 58° C. is maintained even with further increases in the percentage of the sodium acetate in the compound as shown by a constant temperature line 62.

Superimposed upon this graph is a phase diagram including a generally horizontal line 63 and a generally vertical line 65. These lines 63 and 65 together with the lines 60, 61 and 64 separate areas which are designated in FIG. 3 by the encircled capital letters A through F. In these areas A–F the compound has a particular phase which is dependent upon both the percentage of sodium acetate in the compound and the temperature of the compound. For example, above the line 63, in the area designated by the encircled A, the compound consists of anhydrous sodium acetate and water vapor. In the area designated by the encircled D to the right of line 65 and above the line 62, the compound includes anhydrous sodium acetate and water in a liquid, brine type of phase. In the area B, defined by the lines 60, 61, 63 and 65, the compound has a temperature greater than that of its melting point, and a liquid phase. At temperatures below the melting point of the compound in the area C, below the line 60, the sodium acetate in the compound has a liquid phase and the water in the compound has a solid phase.

Of particular interest in the present invention is the phase of the compound at temperatures below its melting point and in proximity to the line 65. In the area E to the right of the line 65 and below the line 62, the compound in a supercooled state forms sodium acetate trihydrate with a precipitate of anhydrous sodium acetate. This precipitate is configured in a multiplicity of flakes which reinforce the crystals of sodium acetate trihydrate when the compound is triggered. As a result of this reinforcement, the compound in this area E crystallizes to form a rigid block. This rigid form is undesirable in the present invention wherein the condensing medium 35 preferably crystallizes in a state which facilitates the pumping of the medium 35.

It will be noted that to the left of the line 65 and below the line 61 in the area F, the compound in the supercooled state forms sodium acetate trihydrate and water in a liquid state. When this compound is triggered, the sodium acetate trihydrate forms a multiplicity of crystals having a particulate configuration. The relative movement of the crystals is enhanced by the lubrication resulting from the excess water in the compound. Thus, this phase of the compound is particularly desirable for use in the present invention since it crystallizes in the generally solid configuration which facilitates the pumping of the crystallized medium 35. This desirable phase can be provided by the compound including approximately 53% of the anhydrous sodium acetate. This particular compound has a melting temperature of approximately 56° C.

In the condenser 31 as heat is absorbed from the first working fluid, the temperature of the condensing medium 35 rises above its melting temperature to provide the medium 35 with a liquid state. In this liquid state, the condensing medium 35 can be permitted to drain from the condenser 31 into a collecting tank 39. Even though the collecting tank 39 will typically be exposed to an ambient temperature, the condensing medium 35 will supercool to maintain its liquid state even at a temperature below its melting point.

One of the major problems associated with solar energy converters of the past has been the fact that the rays 15 of the sun are not available during the night and may even be blocked by clouds or haze during the day. Under these circumstances, the reflector 19 cannot function as a source of heat.

In the present invention, the heat which was absorbed by the condensing medium 35 when solar energy was available is retained as latent heat in the supercooled chemical in the collecting tank 39. When the reflector 19 can no longer function as a heat source, the latent heat in the supercooled condensing medium 35 can be converted into mechanical or electrical energy by the second stage 12. in the second state 12, a pump 41 induces the supercooled medium 35 to flow from the tank 39 into a heat exchanger such as a boiler 43. The boiler 43 typically includes a coil 45 enclosed by a container 47. In a particular embodiment, a second working fluid can be induced to flow through the coil 45 by a pump 49. In the boiler 43, the supercooled chemical 35 is preferably disposed in the container 47 exteriorly of the coil 45. A triggering means can then be injected or otherwise disposed in the container 47 to initiate the crystallization of the supercooled condensing medium 35.

In a preferred embodiment, the triggering means includes a chemical which can be injected into the container 47 by an injection apparatus 51. A triggering means particularly desirable for use with a condensing medium which includes sodium acetate trihydrate is the chemical sodium borate pentahydrate. This chemical can be formed into particles having a maximum dimension of 10 microns, and the particles can be carried by an inert fluid such as silicone oil. This chemical triggering means can be injecting by the apparatus 51 into the container 47. As the triggering chemical mixes with the sodium acetate trihydrate, the particles of sodium acetate trihydrate form nucleation centers about which the condensing medium forms one of a multiplicity of crystals. The characteristics of this particular triggering means are explained in greater detail in copending application Ser. No. 357,817, filed May 7, 1975 assigned to the assignee of the present application.

The crystallization of the supercooled condensing medium 35 will occur at the substantially constant temperature of its melting point. If the second working fluid flowing through the coil 45 has a vaporizing temperature lower than the melting temperature of the condensing medium 35, the second working fluid will vaporize at a high temperature and pressure as the condensing medium 35 crystallizes. This high pressure second working fluid can be introduced to an expander 53 such as a turbine. In the expander 53, the second working fluid initially expands at a substantially constant temperature and pressure and then further expands at a substantially constant entropy to a lower temperature and pressure. This lower temperature may be below the vaporizing temperature of the second working fluid in which case the second working fluid will condense to a liquid state in the expander 53. It will be appreciated that the second working fluid may be heated to a temperature above its normal temperature but below any vaporizing temperature without departing from the scope of the invention.

As the condensing medium 35 crystallizes, it preferably achieves the generally solid state as previously defined. In this state, the crystallized condensing medium 35 can be induced to flow from the boiler 43 back to the condenser 31 by the pump 41. The condensing medium 35 can be retained in the condenser 31 until the daylight hours provide the radiant energy needed to heat the first working fluid and drive the expander 29.

It can be appreciated that the second working fluid can be pumped directly from the expander 53 into the boiler 43. However, the temperature of the second working fluid at the output of the expander 53 will typically be the ambient temperature at the time the boiler 43 is in operation. Since this will typically be the nighttime, the second working fluid at the output of the expander 53 will be exposed to an ambient temperature which is considerably cooler than the daytime ambient temperature. If this relatively cold fluid were returned directly to the boiler 43, a substantial quantity of heat would be needed in the boiler 43 to provide the second working fluid with the desired temperature and pressure.

In a preferred embodiment of the invention, a preheater 55 is provided to receive the second working fluid from the expander 53 so that it can be heated prior to its introduction into the boiler 43. If the second working fluid is retained in the preheater 55 during the daylight hours, this preheating can be accomplished by solar radiation. It will be appreciated, however, that the preheater 55 does not have to be included and that the second working fluid does not have to be preheated.

The preheater 55 can include a container having walls 56 which define an opening 58 through which ambient thermal energy can radiate to raise the temperature of the second working fluid to the ambient temperature. A sheet 57 of transparent material such as plastic is disposed over the opening 58 to inhibit the loss of heat from the second working fluid in the preheater 55. If the walls 56 are insulated, the heat imparted to the second working fluid can be retained in the preheater 55 until the boiler 43 is again needed to provide a source of heat.

A preheater of the type described provides means for raising the temperature of the second working fluid prior to its introduction into the boiler 43. If this increase in temperature is supplied by solar radiation, this feature will further increase the overall efficiency of this particular system.

The melting and vaporizing temperatures of the first and second working fluids and the condensing medium 35 are of particular interest to the present invention. The vaporizing temperature of the first working fluid must be higher than the melting temperature of the condensing medium 35. Furthermore it is important that the second working fluid have a boiling point which is lower than the melting temperature of the condensing medium 35. This will insure that the second working fluid vaporizes in response to the crystallization of the condensing medium 35.

In a preferred embodiment of the present invention, the first working fluid is water which has a vaporizing temperature of 100° C. at atmospheric pressure. The condensing medium 35 includes sodium acetate trihydrate and has a melting temperature of approximately 56° C. The medium 35 also has characteristics for maintaining a liquid state below its melting temperature. In the condenser 31, the water in the vapor state enters the coil 33 at a temperature greater than 100° C. As heat is absorbed by a condensing medium 35, the temperature of the water is lowered to approximately the melting point of the condensing medium 35 which in this particular embodiment is about 56° C. In this fluid state, the water is induced to flow by the pump 37 so that it enters the heat source 11 at a temperature of approximately 58° C. At the output of the particular heat source 11, the water may have a temperature of approximately 158° C. and a pressure of substantially 85 lbs. per square inch. Of course, the temperature and pressure will vary depending on the ambient conditions on a particular day and also the size of the reflector 19.

The sodium acetate trihydrate of the condensing medium 35 in this particular embodiment has a latent heat of crystallization of 42 calories per gram. Thus, with each gram of water condensed in the condenser 31, approximately 13.5 grams of the sodium acetate will be liquified. When the supercooled condensing medium 35 is pumped from the collecting tank 39 into the boiler 43, it is triggered to crystallize at the substantial constant temperature of its melting point. As it crystallizes, the sodium acetate trihydrate releases its latent heat of crystallization at the melting temperature of the condensing medium 35.

In this particular embodiment the second working fluid can be Freon "11" which has a vaporizing temperature or boiling point of approximately 24° C. When exposed to the higher temperature of the crystallizing sodium acetate, the Freon vaporizes to provide a relative high pressure for driving the expander 53.

It is particularly desirable that the boiling temperature of the second working fluid approach the ambient temperature of the environment during daylight hours. Since this ambient temperature is approximately the temperature at which the second working fluid will normally be introduced to the boiler 43, the second working fluid can be vaporized with very little additional heat from the crystallizing condensing medium 35. It is this feature which makes Freon "11" of even further advantage to the present invention since its melting temperature of approximately 24° C. very closely approximates an average daylight ambient temperature.

The heat which is absorbed by the condensing media of the prior art was lost and as a result the energy converters of the prior art were only approximately 50% thermodynamically efficient. In the present invention the heat absorbed by the condensing medium 35 is retained so that the overall efficiency of the present system approached 100%. Furthermore, this heat energy can be stored for a substantially indefinite period of time and its release to the system can be triggered to provide a heat source when solar radiation is no longer available. Thus the primary disadvantage of solar energy, the fact that it is not continuously available, is significantly reduced by the present invention.

Although a particular embodiment of the invention has been described as including two working fluids and two expanders 29 and 53, it will be apparent to those skilled in the art that the invention can also be embodied where a single expander, such as the expander 29, is driven by both the first and second working fluids. A further embodiment might include a single working fluid for driving a single expander, such as the expander 29. Other types of heat sources, and triggering means will also be apparent to those of ordinary skill in the art. Other types of pre-heating means, such as the container 55, can also be used with the present invention. It follows that although the inventive concept has been described with reference to particular embodiments, working fluids, and condensing media, it will be apparent to those skilled in the art that the concept can be otherwise embodied so that the scope of the invention should be ascertained only with reference to the following claims.

I claim:

1. In combination for providing a controlled transfer of heat from a first chemical:

means for providing for a heating of the first chemical;

a container;

conducting means providing for a flow of the first chemical in the heated state through the container;

second chemical means disposed in the container separated from the conducting means but in heat-conducting relationship to the first chemical for absorbing heat from the first chemical in the heated state, the second chemical means being normally disposed in a solid crystalline state and being provided with characteristics for being converted from the solid crystalline state to a liquid state at a controlled temperature and for being retained in the liquid state at temperatures below the controlled temperature;

the second chemical means having characteristics for storing the absorbed heat energy without any heat loss of such heat energy until triggered at a predetermined time at the controlled temperature and for releasing the absorbed heat at the controlled temperature upon such triggering;

means for providing for a triggering of the second chemical means into the crystalline state at the controlled temperature to provide for a release of heat from the second chemical means;

means responsive to the heat released by the second chemical means for using such released heat to provide work energy; and means for providing for the heating of the second chemical means by the first chemical flowing through the container to convert the second chemical means from the crystalline state to the liquid state at the controlled temperature.

2. The combination recited in claim 1 wherein: the second chemical means comprise at least one supercoolable chemical disposed in the container in a generally solid state, the supercoolable chemical having characteristics for melting at the controlled temperature and characteristics for changing to a liquid state at the controlled temperature in response to the absorbed heat from the first chemical means and for being supercooled below the controlled temperature and for being retained in the liquid state below the controlled temperature without any loss of heat energy with the passage of time to store the absorbed heat until the triggering of the second chemical means and wherein the means for providing work energy includes a pump.

3. The combination recited in claim 2 further comprising means for triggering the the supercooled chemical to the solid crystalline state at the controlled temperature to release the absorbed heat.

4. The combination set forth in claim 2 wherein the second chemical means includes sodium acetate trihydrate.

5. A system for converting heat to work energy, comprising:
first chemical means having properties for being heated and for being cooled to transfer heat in accordance with such heating and such cooling;
second means for heating the first chemical means to provide the first chemical means in the heated state;
third means coupled to the second means and responsive to the first chemical means in the heated state to absorb heat and thereby cool the first chemical means;
the third means including a supercooled fluid having properties of solidifying into a solid crystalline state from a liquid state at a particular temperature to release heat and for absorbing heat from the first chemical means to become converted from the solid crystalline state to the liquid state at the particular temperature and of thereafter being retained in the liquid state at temperatures below the particular temperature;
fourth means for absorbing heat from the third means during the conversion of the supercooled chemical in the third means from the liquid state to the solid crystalline state at the particular temperature;
fifth means for providing for a controlled conversion of the supercooled chemical from the third means from the liquid state into the solid crystalline state at the particular temperature;
sixth means for providing for the heating of the third means by the first chemical means to convert the supercooled fluid from the crystallline state to the liquid state at the particular temperature; and
means responsive to the heat absorbed by the fourth means for providing the work energy.

6. The combination set forth in claim 5 wherein means are included for heating the first chemical means by solar energy.

7. The combination set forth in claim 5 wherein the first chemical means includes water and the supercooled chemical in the third means includes sodium acetate trihydrate.

8. Apparatus for converting solar energy into working energy comprising:
first means including a first working fluid having characteristics for being heated and for being cooled;
reflector means responsive to solar radiation to heat the first fluid;
second means for cooling the first fluid from the heated state;
chemical means included in the second means for absorbing heat from the first fluid in the heated state to liquify the chemical means, the chemical means including a supercooled fluid having a solid crystalline state and a particular melting temperature and having characteristics for being converted to a liquid state at the particular melting temperature upon the application of heat and of remaining in the liquid state at temperatures below the particular temperature after being converted from the solid crystalline state to the liquid supercooled state by the application of heat and having characteristics of being triggered from the liquid state to the solid crystalline state at the particular melting temperature for the release of heat;
first pump means for providing a flow of the first working fluid in the cooled state from the second means to the reflector means to become heated by the solar energy from the reflector means;
means for providing for a controlled triggering of the chemical means from the liquid state to the solid crystalline state at the particular melting temperature for the release of heat; and
means responsive to the heat released by the chemical means upon the triggering of the chemical means from the liquid state to the solid crystalline state for providing work energy.

9. The apparatus set forth in claim 8 further comprising:
a second working fluid having characteristics for being heated and for being cooled from the heated state;
fourth means for providing for the heating of the second working fluid in accordance with the heat released by the chemical means upon the triggering of the chemical means from the liquid state to the solid crystalline state at the particular melting temperature; and
fifth means responsive to the second fluid in the heated state to provide the working energy.

10. The apparatus recited in claim 9 wherein the chemical means includes sodium acetate trihydrate and the triggering means includes sodium borate pentahydrate.

11. The apparatus recited in claim 10, wherein: first pump means are included for pumping the first working fluid into position for obtaining a transfer of heat from the first working fluid to the chemical means and wherein second pump means are included for pumping the second working fluid into position for obtaining transfer of heat from the chemical means to the second working fluid.

12. The apparatus set forth in claim 10 wherein the first working fluid includes water and the second working fluid includes Freon "11".

13. The combination recited in claim 10 wherein the chemical means includes anhydrous sodium acetate and water and the ratio of the number of molecules of the water to the number of molecules of the anhydrous sodium acetate is greater than 3.

14. An energy converter including:
   a first heat source;
   a first expander;
   a condenser;
   first means for conducting a first working fluid in a first loop through the first heat source, the first expander, and the condenser,
   a second heat source;
   a second expander;
   second means for conducting a second working fluid in a second loop through the second heat source and the second expander;
   a condensing medium including a supercooled medium having properties of being retained in solid crystalline state at ambient temperatures and of being converted to a liquid state at a particular elevated temperature by the application of heat and of being retained in the liquid state at ambient temperatures and of being triggered to become converted to the solid crystalline state at the particular elevated temperature to provide for a release of heat;
   third means for conducting the condensing medium in a third loop through the condenser to provide for an absorption of heat by the condensing medium and a conversion of the condensing medium from the solid crystalline state to the liquid state and through the second heat source to provide for a triggering of the condensing medium from the liquid state to the solid crystalline state and a release of heat; and
   means for providing for a controlled triggering of the condensing medium in the third loop to provide for a conversion of the condensing medium from the liquid state to the solid crystalline state.

15. The converter recited in claim 14 wherein the condensing medium includes sodium acetate trihydrate.

16. The converter defined in claim 14 wherein the first working fluid has a boiling point which is higher than the melting point of the condensing medium, and the melting point of the condensing medium is higher than the boiling point of the second working fluid.

17. The converter recited in claim 16 wherein the first heat source includes reflector means for concentrating radiant energy to heat the first working fluid.

18. The converter set forth in claim 14 wherein the second heat source includes;
   portions of the third means for conducting the condensing medium through a particular portion of the second means and in proximity to the second working fluid; and
   the means providing the working energy including fourth means disposed relative to the particular portion of the third means for triggering the crystallization of the condensing medium.

19. The converter recited in claim 18 wherein the fourth means includes:
   a chemical having properties for triggering the crystallization of the condensing medium in the supercooled state; and
   means for injecting the triggering chemical into the portions of the third means.

20. The converter recited in claim 19 wherein the condensing medium includes sodium acetate trihydrate and the triggering chemical includes sodium borate pentahydrate.

* * * * *